United States Patent
Roberts et al.

(10) Patent No.: US 7,185,275 B2
(45) Date of Patent: Feb. 27, 2007

(54) METHOD AND COMPUTER SYSTEM FOR ENABLING A USER TO CONSTRUCT A WEB-SITE NAVIGATION

(75) Inventors: Andrew James Roberts, Woodstock, GA (US); Michael Andrew Rowe, Alpharetta, GA (US)

(73) Assignee: International Business Machines Corporation, Armonk, NY (US)

( * ) Notice: Subject to any disclaimer, the term of this patent is extended or adjusted under 35 U.S.C. 154(b) by 795 days.

(21) Appl. No.: 09/794,642

(22) Filed: Feb. 27, 2001

(65) Prior Publication Data

US 2002/0120644 A1    Aug. 29, 2002

(51) Int. Cl.
*G06F 15/00* (2006.01)

(52) U.S. Cl. ............... 715/513; 715/505; 715/500.1

(58) Field of Classification Search .......... 715/513, 715/505, 500.1
See application file for complete search history.

(56) References Cited

U.S. PATENT DOCUMENTS

| | | | |
|---|---|---|---|
| 5,761,683 A | 6/1998 | Logan et al. | 707/513 |
| 5,956,708 A | 9/1999 | Dyko et al. | 707/3 |
| 6,038,598 A * | 3/2000 | Danneels | 709/219 |
| 6,085,120 A | 7/2000 | Schwerdtfeger et al. | 700/90 |
| 6,344,851 B1 * | 2/2002 | Roberts et al. | 345/418 |
| 6,356,910 B1 * | 3/2002 | Zellweger | 707/100 |
| 6,665,837 B1 * | 12/2003 | Dean et al. | 715/501.1 |
| 6,697,815 B1 * | 2/2004 | Wilson | 707/102 |
| 6,697,825 B1 * | 2/2004 | Underwood et al. | 715/530 |
| 6,742,026 B1 * | 5/2004 | Kraenzel et al. | 709/222 |
| 6,907,463 B1 * | 6/2005 | Kleinpeter, III et al. | 709/228 |
| 2002/0049831 A1 * | 4/2002 | Platner et al. | 709/218 |
| 2002/0073011 A1 * | 6/2002 | Brattain et al. | 705/37 |
| 2002/0107882 A1 * | 8/2002 | Gorelick et al. | 707/500.1 |
| 2002/0138383 A1 * | 9/2002 | Rhee | 705/36 |
| 2004/0068527 A1 * | 4/2004 | Smith, III | 707/204 |

* cited by examiner

*Primary Examiner*—Stephen Hong
*Assistant Examiner*—Kristina Honeycutt
(74) *Attorney, Agent, or Firm*—Schmeiser, Olsen & Watts; David R. Irvin

(57) ABSTRACT

A computer system for generating web page navigations. A user interacts with an input form for creating a web page and accepting input that specifies inclusion of the page in a navigation and the hierarchical level of the inclusion. The specifications of the input form are recorded in a view that provides an index into a database. A Java agent reads the view and a set of documents such as Lotus Notes documents indexed by the view and associated with a plurality of web pages to be included in the navigation. Based upon static HTML information contained in the documents, the agent generates the navigation, and inserts links associated with the navigation into the plurality of web pages.

16 Claims, 3 Drawing Sheets

METHOD AND COMPUTER SYSTEM FOR ENABLING A USER TO CONSTRUCT A WEB-SITE NAVIGATION

FIELD OF THE INVENTION

The present invention concerns the web pages of an Internet web site, and more particularly the construction of a navigation among the web pages of an Internet web site.

BACKGROUND OF THE INVENTION

With the success and rapid growth of the Internet-based World Wide Web, the commercial importance of having an up-to-date, easy-to-use web site has become paramount for many businesses, both large and small. One aspect of providing an effective web site is providing customers with a way of finding their way through the pages of the site in a logical, satisfying way. This is accomplished by providing a navigation, or a hierarchical way of linking from one page to another, so that a customer may understand clearly how to progress from general to specific and from specific to general.

Special skills are now required to construct navigations. The need for special skills constrains the responsiveness with which a business can address a need for change in its site's navigation. Someone who is skilled in providing web-site content is not necessarily also skilled in the important task of constructing an effective navigation to guide customers through the content. This often means that unwanted expense and delay is incurred in providing and adapting an effective web site, as at least two experts are required—a content expert and a navigation expert.

Consequently, there is a need for a simple, economical, and effective way to enable a content expert to construct a navigation without reliance upon a second party such as a navigation expert.

SUMMARY OF THE INVENTION

The present invention provides a simple, economical, and effective method and computer system to enable a content expert to generate a navigation without reliance upon a second party such as a navigation expert.

Accordingly, one aspect of the present invention is a computer system for generating web page navigations. An input form is provided so that a user may specify the inclusion of a web page in a navigation and the hierarchical level at which the web page is to be included. The specifications of the input farm arc stored in a view, which is an index into a database, such as a LOTUS NOTES® view. An agent such as a Java agent is provided to rend both the view and also a set of documents such as LOTUS NOTES® documents that are indexed by the view. These documents are associated with the set of web pages to be included in the navigation. Based upon static HTML information contained in the documents, the agent generates the navigation, and inserts links associated with the navigation into the set of web pages.

Another aspect of the present invention is a method for generating navigations. According to this method, the user edits an input form to specify inclusion of the web page in the navigation and to specify the hierarchical level of inclusion. In response, a view is written to store the users choices. The view is then read to identify documents associated with a set of web pages that are to be included in the navigation. The navigation is then generated in response to the documents and the hierarchical level of the web page specified by the user via the input form. The documents upon which this is based contain static HTML. Links associated with the navigation are then inserted into the set of web pages.

Thus the present invention provides a quick, economical way of generating navigations, which may be employed by content experts to generate navigations that enable customers to partake of a web site's offerings in a logical and pleasing way. These and other aspects of the present invention will become apparent to those skilled in the art after reading the following descriptions of embodiments of the invention when considered together with the drawings.

DETAILED DESCRIPTION OF THE INVENTION

Figure 1:
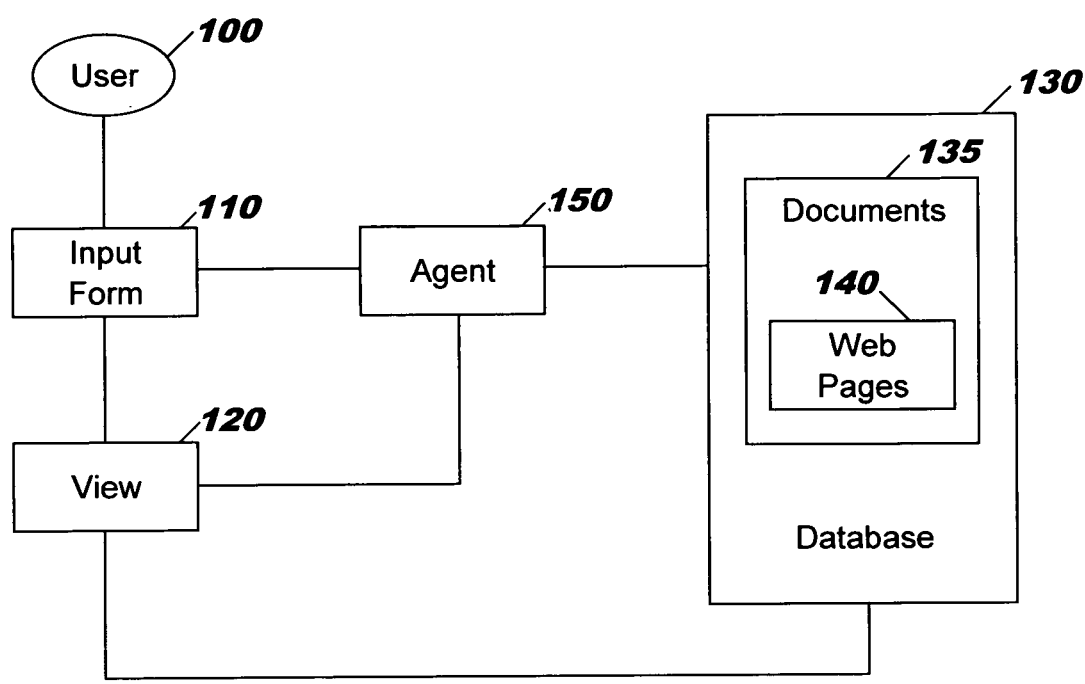
FIG. 1 is a block diagram that shows a computer system according an embodiment of the present invention.

The invention will now be described more fully, making reference to the accompanying drawings, which show exemplary embodiments of the invention. In the drawings and in the description that follows, like numbers refer to like elements throughout. The invention may also be embodied in many different forms; consequently, the invention should not be construed to be limited to the embodiments set forth here. Rather, these embodiments are provided so that this disclosure will be thorough and complete, and will fully convey the scope of the invention to those skilled in the art. As will be appreciated by one of skill in the art, the invention may be embodied as methods or devices. Accordingly, the present invention may take the form of an embodiment entirely in hardware, an embodiment entirely in software, or an embodiment combining hardware and software aspects.

In this description and the appended claims, terms have the following meanings:

Database—a collection of documents indexed by a view; for example, a LOTUS NOTES® database is a collection of LOTUS NOTES® documents indexed by a LOTUS NOTES® view.

Document—an entity in a database such as a field of data or an object, for example a LOTUS NOTES® document.

View—an index into a database that selects a subset of the entities in the database, for example a LOTUS NOTES® view.

Input Form—a form that enables a user to create a document, for example a form that enables a user to edit a web page and to specify whether the web page is to be included in a navigation.

Navigation—a set of links among members of a set of related web pages.

Navigation hierarchy—the structure of the navigation of a web site, organized for example from general to specific as a hierarchy of channels, sub-channels, sections, and sub-sections.

Publish—to generate HTML for a web page.

Static HTML document—an HTML code snippet contained in a document.

FIG. 1 shows a computer system that enables a user to generate a navigation. A user 100 who desires to construct a navigation interacts with an input form 110, which would typically be presented to the user on a computer display (not shown). The input form 110 enables the user 100 to specify whether or not a particular web page is to be included in the navigation through a yes-or-no selection, and may also enable the user to edit and create web pages 140.

Responsive to the users choice of yes or no, the input form accordingly writes a view 120. The view is an index into a database 130, which is a collection of documents 135 that are indexed by the view 120. In one embodiment of the invention, the database is LOTUS NOTES® database comprising a collection of LOTUS NOTES® documents that are indexed by way of a LOTUS NOTES® view; the LOTUS NOTES® documents are entities in the LOTUS NOTES® database such as objects and fields of data. Note that "LN" stands for LOTUS NOTES®.

An agent 150 has access to the view 120 and the database 130, in particular to the documents 135 and web pages 140 within the database 130. In one embodiment of the invention, the agent is a Java agent, whose operation is explained below.

Figure 2:
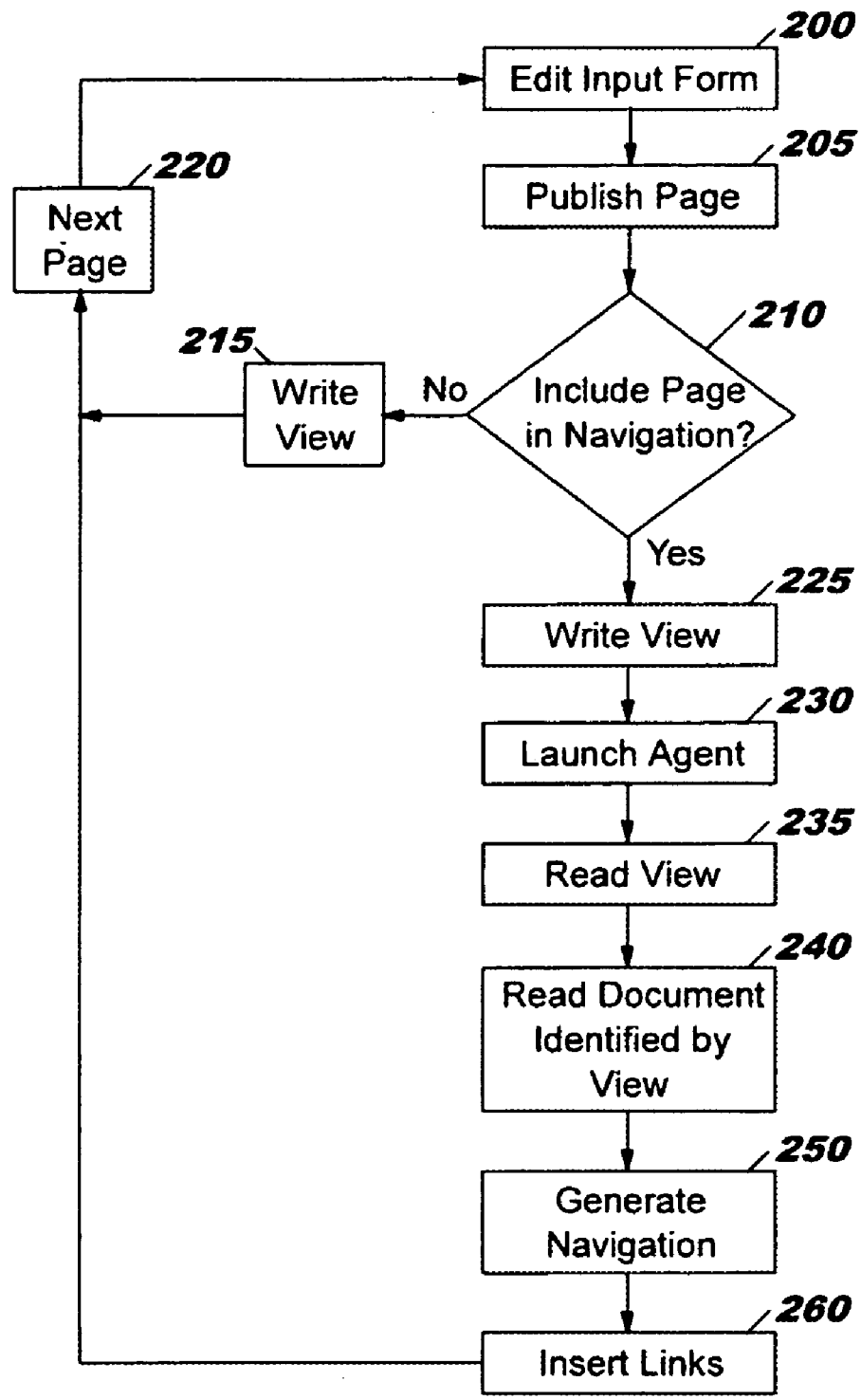
FIG. 2 is a flowchart that shows an exemplary method of operation for the computer system illustrated by FIG. 1.

FIG. 2 shows a method of operation of the computer system shown in FIG. 1. As shown in FIG. 2, the user 100 edits the input form 110 to specify a web page and whether or not the web page specified by the input form 110 is to be included in the navigation (step 200). Upon completion of the editing, the web page is published (step 205). The indication of the user 100 concerning the inclusion of the web page into the navigation is then examined (step 210).

If the web page is not to be included in the navigation, the view 120 is written accordingly (step 215), and the user progresses to the next web page. Otherwise (i.e., the web page is to be included in the navigation), the view 120 is written accordingly (step 225), and the agent 150 is launched (step 230).

Upon its launch, the agent 150 reads the view 120 to determine which web pages 140 from the database 130 are to be included in the navigation; and in particular, the agent 150 determines which documents 135 are identified by the view 120 (step 235). The agent 120 then reads these documents 135 including static HTML documents identified by the view 120 (step 240). From the contents of the static HTML documents, the agent 150 generates the navigation (step 250), and inserts links describing the navigation into the web pages 140 (step 260). When this has been accomplished, control is transferred back to the user, who proceeds to the next web page (step 220).

Figure 3:
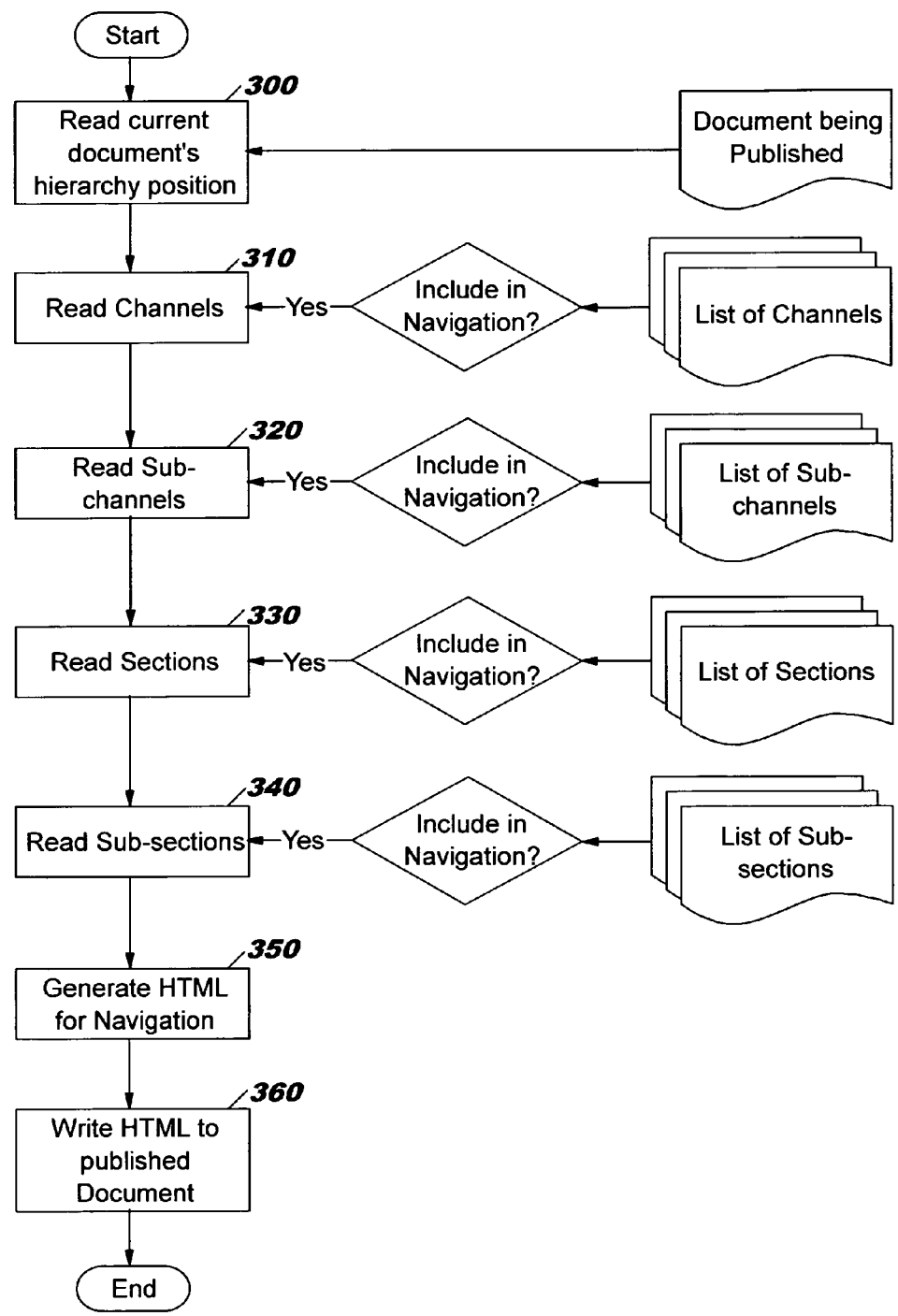
FIG. 3 gives further information regarding the exemplary method of operation illustrated by FIG. 2.

FIG. 3 shows other aspects of the operation of the agent 150. The agent 150 reads (step 300) the hierarchical position of the published page (step 205). If channels are to be included in the navigation, the agent 150 reads the channels (step 310). If sub-channels are to be included in the navigation, the agent 150 reads the sub-channels (step 320). If sections are to be included in the navigation, the agent 150 reads the sections (step 330). If sub-sections are to be included in the navigation, the agent 150 reads the sub-sections (step 340). Upon completion of the reading and based thereupon, the agent generates HTML for the navigation (step 350), and writes the HTML to the published page (step 360).

From the foregoing description, those skilled in the art will appreciate that the present invention efficiently and economically enables users to build navigations with minimal involvement, in fact with only a single mouse click that specifies the inclusion or not of a web page presented by the input form 110. This results in a considerable savings of time for the user, and enables users who have skills that are less specialized than those traditionally required to build navigations effortlessly. The foregoing description, however, is illustrative rather than limiting, and the scope of present invention is limited only by the following claims.

We claim:

1. A computer system, comprising software code which when executed implement a method for generating web page navigation through an Internet web site, comprising generating a linked sequence of web pages such that all of said web pages in the linked sequence are within the Internet website, said generating the linked sequence of web pages comprising executing a plurality of iterations of a loop, wherein executing each iteration of the plurality of iterations comprises:

presenting an input form to a user, said input form identifying to the user a web page that is specific to the iteration being executed;

receiving from the user a directive specifying whether or not to include the identified web page in the linked sequence of web pages;

if the received directive specifies to include the identified web page in the linked sequence of web pages then;

receiving from the user a specification of a hierarchical level at which the identified web page is to be included in the linked sequence of web pages;

writing a view, said view identifying a plurality of documents in a database, said plurality of documents being associated respectively with a plurality of web pages to be included in die linked sequence of web pages, said plurality of web pages including the identified web page and at least one other web page hierarchically associated with the identified web page;

reading the view;

reading the documents identified by the view; and generating a portion of the linked sequence of web pages in response to the documents read and the hierarchical level of the identified web page, said generating the portion of the linked sequence of web pages including inserting one or more links into the plurality of web pages based on the hierarchical level of the identified web page and on the hierarchical association of the at least one other web page with the identified web page.

2. The computer system of claim 1, wherein between said presenting and said receiving, each iteration further comprises publishing the identified web page, said publishing comprising generating HTML for the identified web page.

3. The computer system of claim 1, wherein at least one document of the plurality of documents identified by the view comprises a static HTML document.

4. The computer system of claim 1, wherein at least one document of the plurality of documents comprises a HTML code snippet.

5. The computer system of claim 1, wherein the input form creates a first document associated with the identified web page.

6. The computer system of claim 1, wherein said reading the view and said reading the documents are performed by an agent.

7. The computer system of claim 6, wherein the agent is a Java agent.

8. The computer system of claim 1, wherein said receiving the directive from the user comprises detecting no more than a single click of a mouse by the user to specify whether or not to include the identified web page in the linked sequence of web pages.

9. A method for generating web page navigation through an Internet web site, comprising generating a linked sequence of web pages such that all of said web pages in the linked sequence are within the Internet website, said generating the linked sequence of web pages comprising executing a plurality of iterations of a loop, wherein executing each iteration of the plurality of iterations comprises:

presenting an input form to a user, said input form identifying to the user a web page that is specific to the iteration being executed;

receiving from the user a directive specifying whether or not to include the identified web page in the linked sequence of web pages;

if the received directive specifies to include the identified web page in the linked sequence of web pages then;

receiving from the user a specification of a hierarchical level at which the identified web page is to be included in the linked sequence of web pages;

writing a view, said view identifying a plurality of documents in a database, said plurality of documents being associated respectively with a plurality of web pages to be included in the linked sequence of web pages, said plurality of web pages including the identified web page and at least one other web page hierarchically associated with the identified web page;

reading the view;

reading the documents identified by the view; and generating a portion of the linked sequence of web pages in response to the documents read and the hierarchical level of the identified web page, said generating the portion of the linked sequence of web pages including inserting one or more links into the plurality of web pages based on the hierarchical level of the identified web page and on the hierarchical association of the at least one other web page with the identified web page.

10. The method of claim 9, wherein the documents read comprise at least one static HTML document.

11. The method claim 9, wherein said reading the view and said reading the documents are performed by an agent.

12. The method of claim 11, wherein the agent is a Java agent.

13. The method of claim 9, wherein the input form creates a first document associated with the identified web page.

14. The method of claim 9, wherein said receiving the directive from the user comprises detecting no more than a single click of a mouse by the user to specify whether or not to include the identified web page in the linked sequence of web pages.

15. The method of claim 9, wherein between said presenting and said receiving, each iteration further comprises publishing the identified web page, said publishing comprising generating HTML for the identified web page.

16. The method of claim 9, wherein at least one document of the plurality of documents comprises a HTML code snippet.

* * * * *